(12) United States Patent
Cordos

(10) Patent No.: US 8,837,639 B2
(45) Date of Patent: Sep. 16, 2014

(54) PARALLEL SYNCHRONIZING CELL WITH IMPROVED MEAN TIME BETWEEN FAILURES

(75) Inventor: Ioan Cordos, Thornhill (CA)

(73) Assignee: ATI Technologies ULC, Markham, ON (CA)

( * ) Notice: Subject to any disclaimer, the term of this patent is extended or adjusted under 35 U.S.C. 154(b) by 681 days.

(21) Appl. No.: 12/818,219

(22) Filed: Jun. 18, 2010

(65) Prior Publication Data

US 2011/0309865 A1    Dec. 22, 2011

(51) Int. Cl.
  *H03K 9/06*   (2006.01)
  *H04L 7/033*  (2006.01)
  *H04L 7/02*   (2006.01)

(52) U.S. Cl.
  CPC .............. *H04L 7/0338* (2013.01); *H04L 7/02* (2013.01)
  USPC ........... 375/322; 327/115; 327/117; 327/291

(58) Field of Classification Search
  None
  See application file for complete search history.

(56) References Cited

U.S. PATENT DOCUMENTS

| | | | | |
|---|---|---|---|---|
| 5,828,249 A | * | 10/1998 | Sessions | 327/115 |
| 6,097,234 A | * | 8/2000 | Yeo | 327/295 |
| 6,118,319 A | * | 9/2000 | Yamada et al. | 327/291 |
| 6,823,029 B1 | * | 11/2004 | Chapman et al. | 375/354 |
| 7,336,731 B2 | * | 2/2008 | Marume | 375/322 |
| 8,289,336 B2 | * | 10/2012 | Kuhwald et al. | 345/532 |
| 2006/0078079 A1 | * | 4/2006 | Lu | 375/376 |
| 2007/0257714 A1 | * | 11/2007 | Cheung | 327/117 |

OTHER PUBLICATIONS

Kim, Suk-Jin, et al., "A Parallel Flop Synchronizer for Bridging Asynchronous Clock Domains," 2004 IEEE Asia-Pacific Conference on Advanced System Integrated Circuits, Aug. 4-5, 2004, pp. 184-187.

* cited by examiner

*Primary Examiner* — Leon-Viet Nguyen
(74) *Attorney, Agent, or Firm* — Abel Law Group, LLP

(57) ABSTRACT

In some embodiments, a synchronizing circuit includes at least one synchronization device that operates at a lower clock frequency than another synchronization device in the synchronization circuit. In at least one embodiment of the invention, a method includes sampling a first signal at a first frequency to thereby generate a plurality of sampled versions of the first signal. The first frequency is a frequency of a clock signal divided by N. N is a number greater than one. The method includes sampling a second signal at the frequency of the clock signal. The second signal is based on sequentially selected ones of the plurality of sampled versions of the first signal to thereby generate an output version of the first signal.

22 Claims, 6 Drawing Sheets

PARALLEL SYNCHRONIZING CELL WITH IMPROVED MEAN TIME BETWEEN FAILURES

BACKGROUND

1. Field of the Invention

The invention is related to digital integrated circuits and more particularly to synchronization circuits.

2. Description of the Related Art

In general, synchronization of digital signals transferred between asynchronous clock domains is performed using synchronizing devices (e.g., flip-flops) controlled by a destination clock signal. The asynchronous character of the interface can result in a data or control input changing at the instant of the destination clock signal transition. As a result, the synchronizing device becomes metastable, i.e., the output behaves unpredictably, taking many times longer than normal to settle to its correct state, or even oscillating several times before settling. In a typical computing system, metastability can cause data corruption and/or is fatal to program execution. Mean time between failures is a parameter that quantifies the capability of a destination device to resolve a metastable event. Mean time between failures is exponentially proportional to the destination clock period. Mean time between failures typically degrades with reduction of power supply voltage, which is the trend in digital integrated circuits.

SUMMARY OF EMBODIMENTS OF THE INVENTION

In some embodiments, a synchronizing circuit includes at least one synchronization device that operates at a lower clock frequency than another synchronization device in the synchronization circuit. In at least one embodiment of the invention, a method includes sampling a first signal at a first frequency to thereby generate a plurality of sampled versions of the first signal. The first frequency is a frequency of a clock signal divided by N. N is a number greater than one. The method includes sampling a second signal at the frequency of the clock signal. The second signal is based on sequentially selected ones of the plurality of sampled versions of the first signal to thereby generate an output version of the first signal.

In at least one embodiment of the invention, and apparatus includes a first sampling circuit operative to generate a version of a signal based on sequential selection of individual sampled versions of the signal from a plurality of sampled versions of the signal. The plurality of sampled versions of the signal are sampled at a first frequency. The first frequency is a frequency of a clock signal divided by N. N is a number greater than one. The apparatus includes a second sampling circuit operative to sample the version of the signal at the frequency of the clock signal to thereby generate an output signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
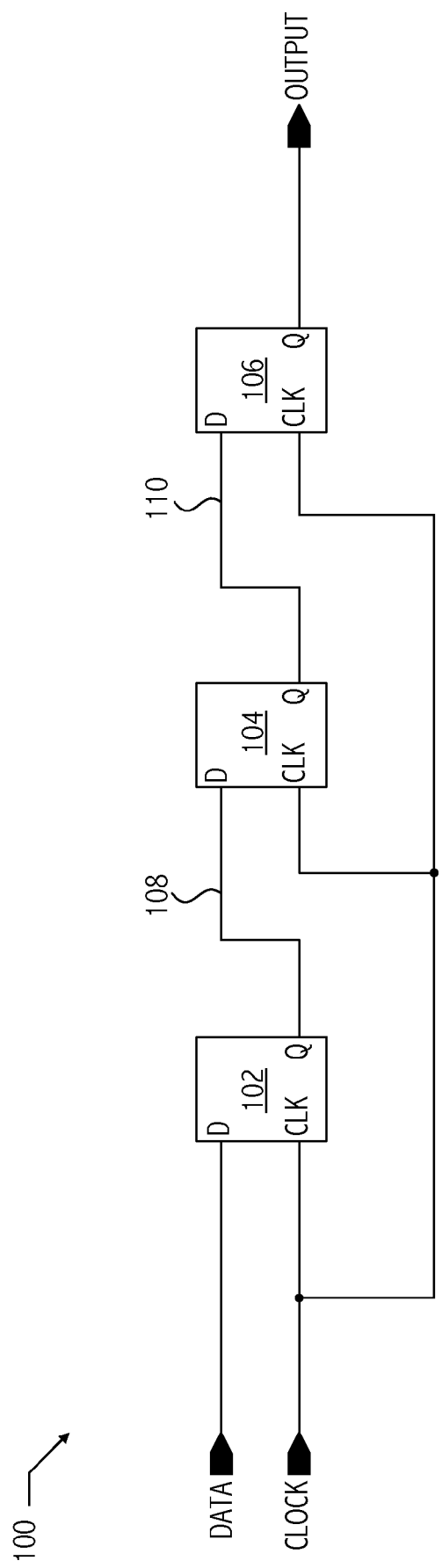
FIG. 1 illustrates an exemplary synchronization circuit including serial flip-flops.

Referring to FIG. 1, a technique for suppressing metastability serially connects two or more synchronization devices (e.g., flip-flops) in a chain, i.e., the output of each synchronization device feeds the data input of the next, and all devices share a common clock. This technique reduces the probability of a metastable event to a negligible value. The probability of metastability approaches zero as the number of flip-flops connected in series increases. An exemplary synchronization circuit includes a plurality of flip-flops (e.g., flip-flops 102, 104, and 106) coupled in series to provide an output synchronous to a local clock signal (e.g., CLOCK). If an input signal from a source domain arrives during the aperture of flip-flop 102, the output of flip-flop 102 enters a metastable state. Flip-flop 104 provides an entire clock cycle for signal 108 to resolve any metastability before latching signal 108. Typically, the number of flip-flops used in a synchronous circuit is based on a target mean time between failures. In general, the number of flip-flops is greater for applications with a target mean time between failures that is greater than other applications with a lower mean time between failures. Even if flip-flop 102 is likely to become metastable, only the last flip-flop in the chain (e.g., flip-flop 106) needs to operate as expected for the synchronization circuit to behave as expected. However, if the clock speed is high enough (e.g., greater than 1 GHz) for a specific process corner, all three flip-flops can become metastable. As clock speeds increase, a synchronization circuit consistent with FIG. 1 includes additional synchronization devices to increase the mean time between failures of the synchronization circuit. This technique introduces a data latency that is directly proportional to the number of synchronization devices in the synchronization circuit, which may be unacceptable in some applications.

Figure 2:
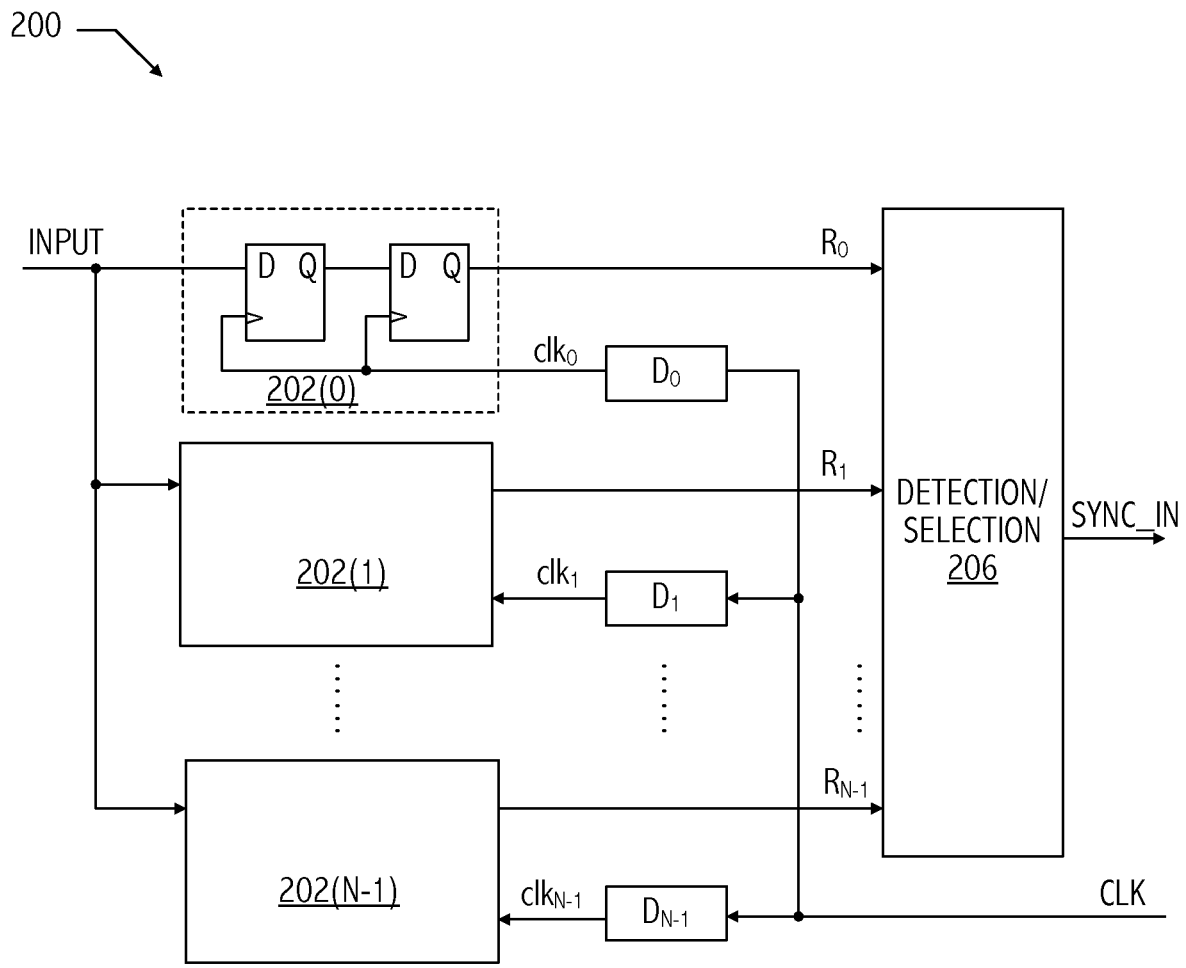
FIG. 2 illustrates an exemplary two-stage parallel synchronization circuit.

Referring to FIG. 2, a two-stage synchronization circuit includes a bank of synchronization device stages coupled in parallel (e.g., flip-flop stages 202(0), 202(1), . . . , 202(N−1)) and a detection/selection stage (e.g., detection/selection circuit 206). Each flip-flop stage receives an input signal (e.g., INPUT) and includes multiple flip-flops coupled in series (e.g., two flip-flops). Delay elements (e.g., $D_0, D_1, \ldots, D_{N-1}$) are used to generate multiple clock signals by delaying a local clock signal (e.g., CLK) by $D_i$, where $D_i = i(T_c/N)$, where $T_c$ is a clock cycle time of the local clock domain and N is the number of parallel banks. The period of each of $clk_0$, $clk_1, \ldots, clk_{N-1}$ is the same as the period of CLK. The multiple clock signals trigger the flip-flop stages at different times, thus each of flip-flop stages 202(0), 202(1), . . . , 202(N−1) samples the data signal at different times. Accordingly, the synchronization circuit samples the input signal at N times of the local clock rate. If any first flip-flop of a flip-flop stage becomes metastable, then a next adjacent, serially coupled flip-flop provides one clock cycle to resolve the metastability. Detection/selection circuit 206 detects a first transition among the outputs of the bank of flip-flop stages (e.g., $R_0, R_1, \ldots, R_{N-1}$), which indicates arrival of a new input. Detection/selection circuit 206 generates an output signal (e.g., SYNCH_IN) that transitions high when a value of one of $R_0, R_1, \ldots, R_{N-1}$ is different from the others and transitions low when all of $R_0$, $R_1, \ldots, R_{N-1}$ are the same. When using flip-flop stages that include only two flip-flops, this technique typically has a lower latency than the technique of FIG. 1. However, at high frequency clock speeds, this technique is likely to generate a glitch on the output signal due to the likelihood that one of the parallel flip-flop stages is metastable.

Figure 3A:
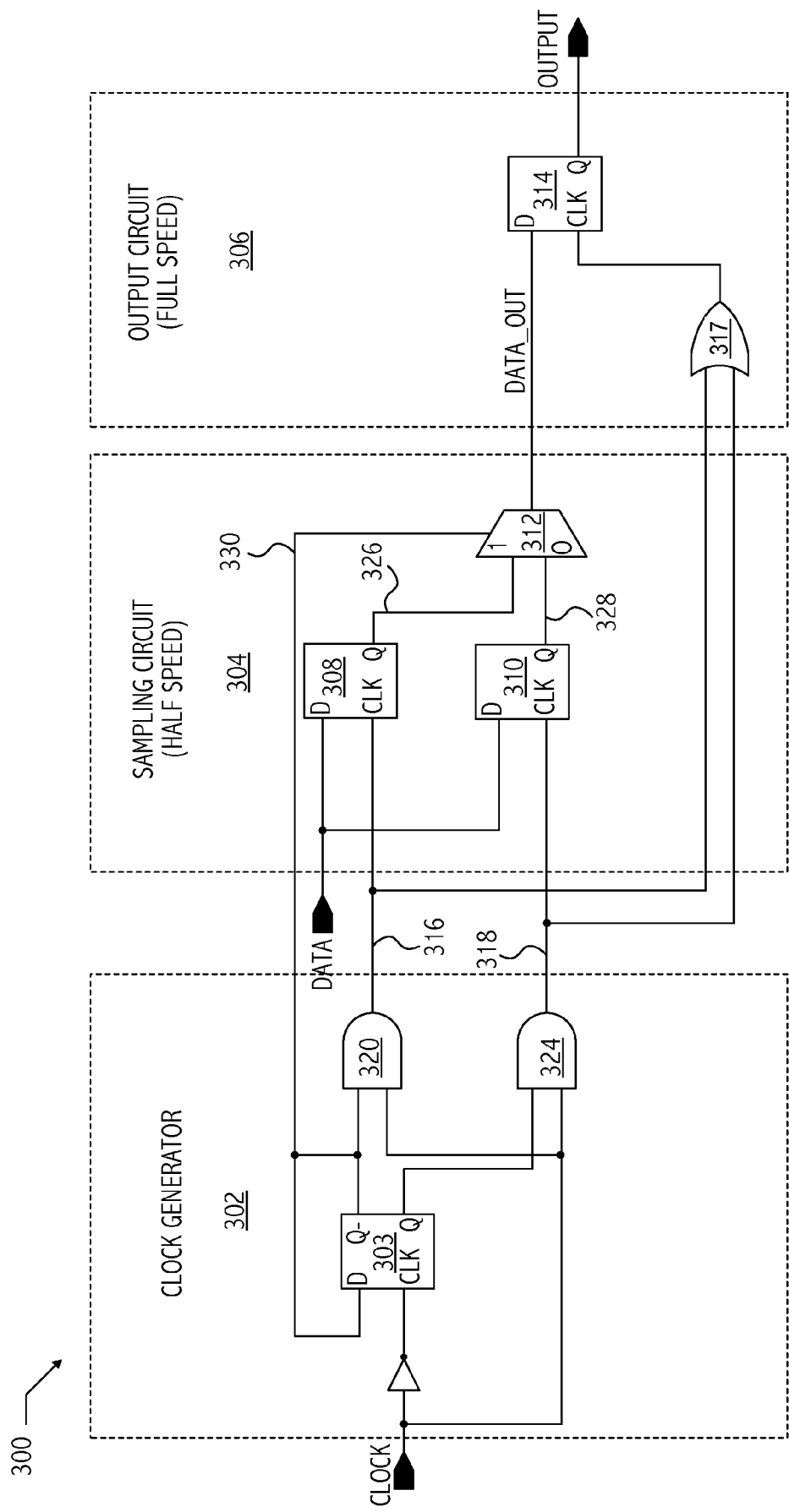
FIG. 3A illustrates an exemplary synchronization circuit including two synchronization devices operating in parallel consistent with at least one embodiment of the invention.
Figure 3B:
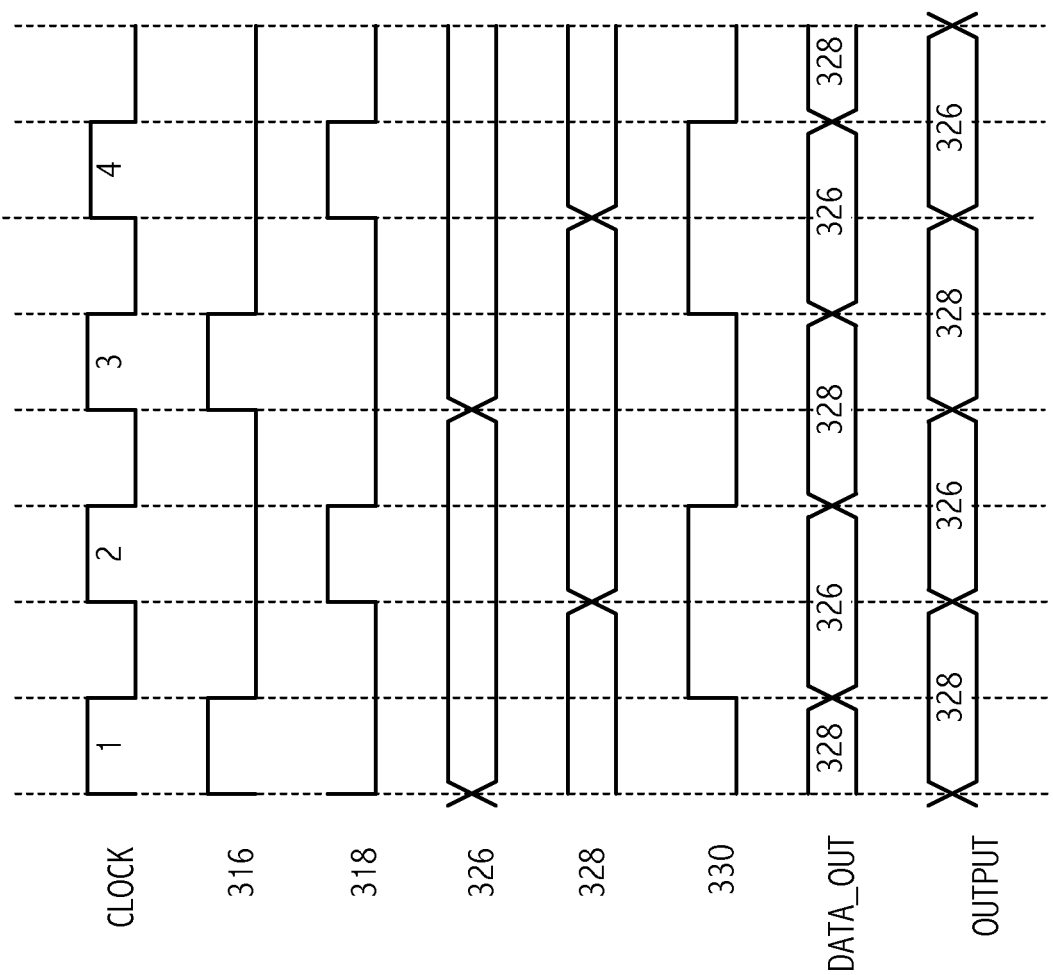
FIG. 3B illustrates exemplary timing diagrams for the synchronization circuit of FIG. 3A consistent with at least one embodiment of the invention.

Referring to FIGS. 3A and 3B, an exemplary synchronization circuit (e.g., synchronization circuit 300) includes a sampling circuit (e.g., sampling circuit 304) that operates at half the speed of the local clock signal (e.g., CLOCK) and an output circuit (e.g., output circuit 306) that operates at the same speed as the local clock signal. In at least one embodiment, sampling circuit 304 includes two flip-flops coupled in parallel (e.g., flip-flops 308 and 310) that sample the input signal (e.g., DATA) at successive clock cycles. For example, flip-flop 308 samples DATA in response to odd clock cycles of CLOCK and flip-flop 310 samples DATA in response to even clock cycles of CLOCK. Flip-flop 308 receives an odd clock signal, e.g., clock signal 316, which has a frequency that is half the frequency of CLOCK and that has a high value for at least half of an odd clock cycle of CLOCK and a low value otherwise (e.g., the remainder of an odd clock cycle of CLOCK plus the width of the even clock cycle). Flip-flop 310 receives an even clock signal, e.g., clock signal 318, which has a frequency that is half the frequency of CLOCK and that has a high value for at least a half of an even clock cycle of CLOCK. Since flip-flops 308 and 310 are controlled by clock signals having frequencies that are half the frequency of CLOCK, twice as much time is available for metastabilities to resolve. In at least one embodiment of synchronization circuit 300, the flip-flops are edge-triggered, and duty-cycles of the even and odd clock signals may vary.

In at least one embodiment of synchronization circuit 300, a clock generator circuit (e.g., clock generator circuit 302) generates the even and odd clock signals using digital logic gates (e.g., AND gates 320 and 324). In at least one embodiment, clock generator circuit 302 gates CLOCK with two enable signals. In at least one embodiment of clock generator circuit 302, the enable signals are outputs of a clock divider that divides the clock by two (e.g., true and complementary outputs of flip-flop 303), based on the falling edge of CLOCK. Note that clock generator circuit 302 is exemplary only and other suitable circuits may be used to generate even and odd clock signals.

In at least one embodiment of synchronization circuit 300, sampling circuit 304 includes a selection circuit (e.g., multiplexer 312) that generates a version of DATA based on even and odd samples of DATA (i.e., based on versions of DATA sampled by even and odd clock signals). In at least one embodiment, multiplexer 312 is responsive to a control signal provided by clock generator circuit 302, e.g., one of the enable signals used to generate the even and odd clock signals to select alternating one of outputs of flip-flops 308 and 310 (i.e., sequentially selects sampled versions of DATA, e.g., signals 326 and 328). In embodiments where clock generator circuit 302 generates the control signals on the falling edge of CLOCK and the outputs of flip-flops 308 and 310 change on rising edges of CLOCK, the output of multiplexer 312 (e.g., DATA_OUT), which is a version of DATA having the same frequency as CLOCK, will not glitch. Output circuit 306 samples the output of multiplexer 312 (e.g., using flip-flop 314) to thereby generate the output signal (e.g., OUTPUT). In at least one embodiment, output circuit 306 receives a delayed version of the local clock signal that is generated using a logical combination (e.g., a logical OR, using OR-gate 317) of the even and odd clock signals. In at least one embodiment, the delayed version of the local clock signal is generated using other techniques, e.g., using one or more clock buffers driven by CLOCK. In at least one embodiment, synchronization circuit 300 has a latency of two cycles of the local clock signal and has a mean time between failures that is comparable to the mean time between failures of the synchronization circuit of FIG. 1, which includes three serially-coupled flip-flops. The one clock cycle improvement in latency is achieved by operating two flip-flops at half-speed of CLOCK.

Figure 4A:
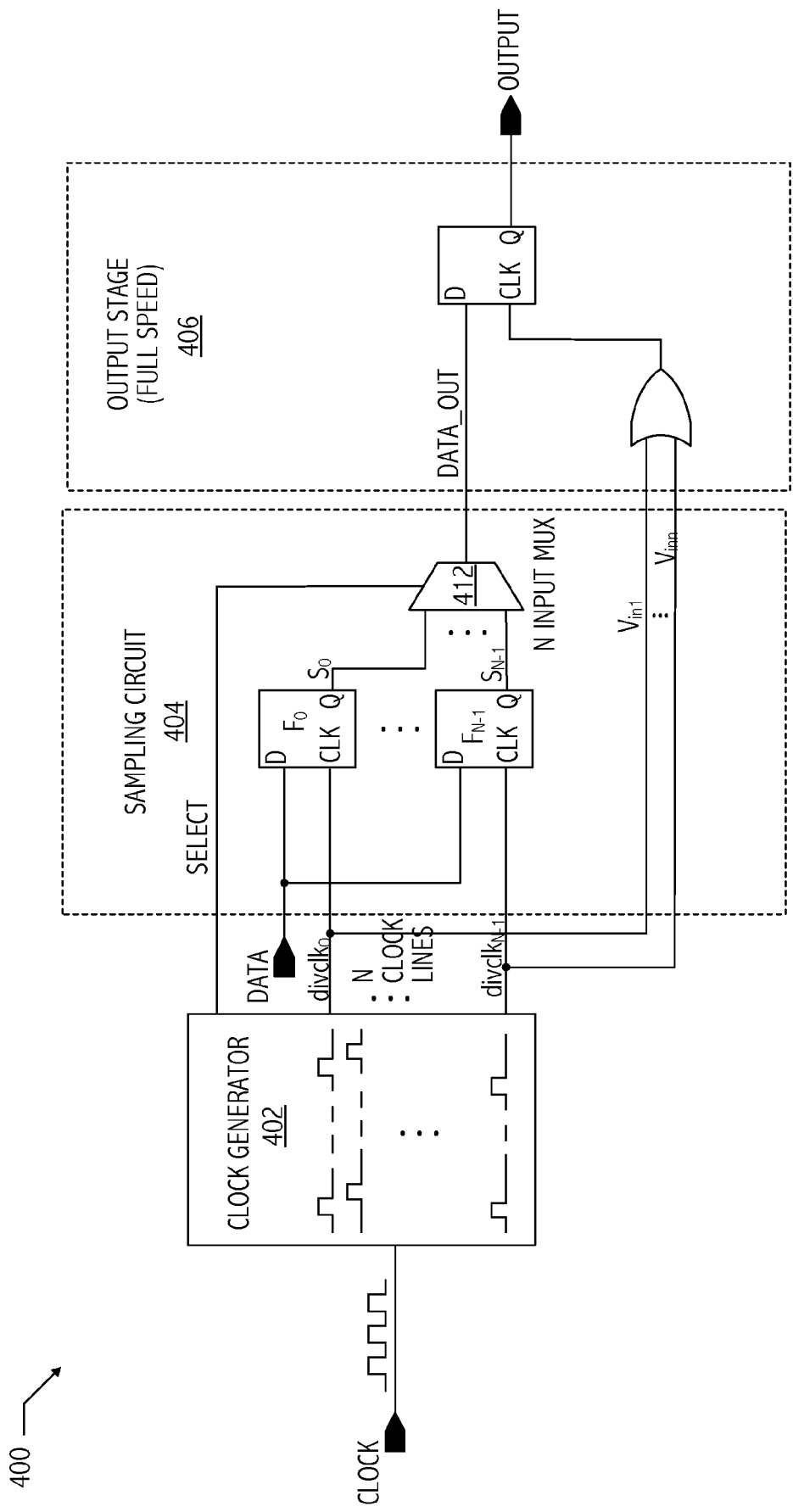
FIG. 4A illustrates an exemplary synchronization circuit including N synchronization devices operating in parallel consistent with at least one embodiment of the invention.
Figure 4B:
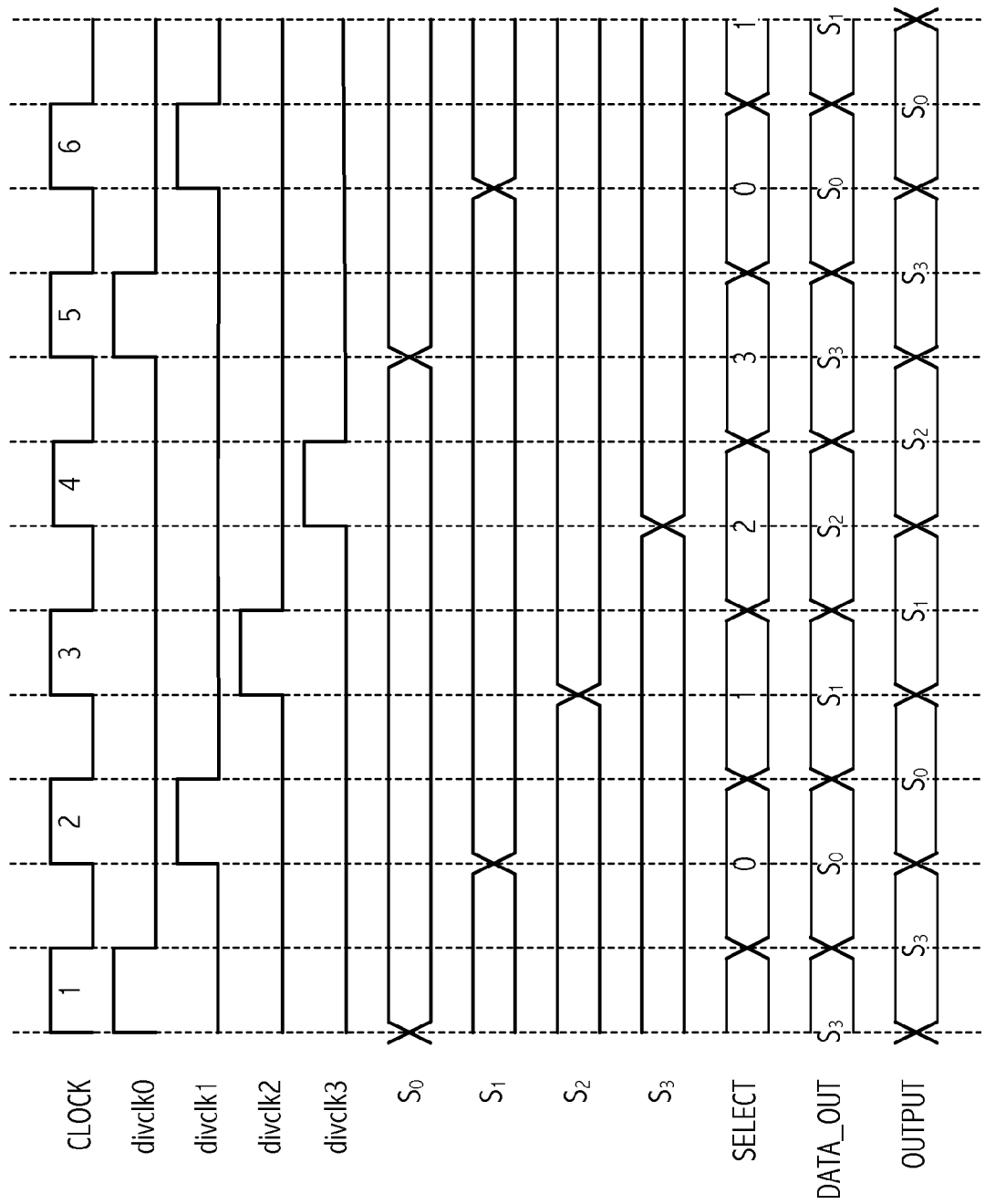
FIG. 4B illustrates exemplary timing diagrams for the synchronization circuit of FIG. 4A where N=4 consistent with at least one embodiment of the invention.

Referring to FIGS. 4A and 4B, in at least one embodiment, a synchronization circuit (e.g., synchronization circuit 400), includes N flip-flops in parallel ($F_0, F_1, \ldots, F_{N-1}$) that operate at 1/N of the frequency of the local clock signal (e.g., CLOCK) to provide additional clock cycles to resolve metastability. In at least one embodiment of synchronization circuit 400, N is an integer greater than 1, (e.g., N equals 4). In at least one embodiment of synchronization circuit 400, a sampling circuit (e.g., sampling circuit 404) receives N phases (e.g., $divclk_0, divclk_1, \ldots, divclk_{N-1}$) of a frequency-divided version of a local clock signal. In at least one embodiment of synchronization circuit 400, the period of each of the N phases of the frequency-divided version of a local clock signal is the same as the period of the frequency-divided version of the local clock. In at least one embodiment of synchronization circuit 400, at any particular time, only one of the N phases of the frequency-divided version of a local clock signal is active while the others remain inactive. Accordingly, $divclk_0, divclk_1, \ldots, divclk_{N-1}$ trigger the synchronization devices at different times so that they sample the data signal at different clock cycles of the local clock signal. Note that in other embodiments of synchronization circuit 400, where the synchronization devices are edge-triggered flip-flops, the N phases of the frequency-divided version of the local clock signal have overlapping active phases and/or duty cycles may vary. In at least one embodiment of synchronization circuit 400, $divclk_0, divclk_1, \ldots, divclk_{N-1}$ have a minimum pulse width of approximately half of the clock cycle of CLOCK, but may have greater pulse widths (e.g., pulse widths equal to the period of CLOCK). Since flip-flops $F_0, F_1, \ldots, F_{N-1}$ are controlled by clock signals having frequencies that are 1/N of the frequency of CLOCK, a period of N times the period of CLOCK is available to resolve any metastabilities on $S_0, S_1, \ldots, S_{N-1}$. In at least one embodiment, clock generator circuit 402 generates $divclk_0, divclk_1, \ldots, divclk_{N-1}$ using any suitable technique (e.g., delay elements, logic devices, or clock gater circuits).

In at least one embodiment of synchronization circuit 400, the outputs of flip-flops $F_0, F_1, \ldots, F_{N-1}$, are N samples of DATA (e.g., $S_0, S_1, \ldots, S_{N-1}$), each signal having a frequency that is 1/N of the local clock frequency. The N samples are provided to a select circuit (e.g., multiplexer 412), which sequentially selects individual ones of $S_0, S_1, \ldots, S_{N-1}$ as the DATA_OUT signal, thereby constructing a delayed version of DATA (e.g., DATA_OUT) having the same frequency as CLOCK. In at least one embodiment of synchronization circuit 400, output circuit 406 samples (e.g., using flip-flop 314) the output of multiplexer 412 at the frequency of CLOCK to thereby generate a version of DATA (e.g., OUTPUT) synchronized to the local clock signal. In at least one embodiment, output circuit 406 receives a delayed version of the local clock signal that is generated using a logical combination (e.g., a logical OR) of the N phases of the frequency-divided version of a local clock signal, $divclk_0$, $divclk_1$, ..., $divclk_{N-1}$. In at least one embodiment, the delayed version of the local clock signal is generated using other techniques. In at least one embodiment, synchronization circuit 400 has a latency of two cycles of the local clock and has a mean time between failures that is comparable to the mean time between failures of a synchronization circuit similar to that of FIG. 1 (e.g., a synchronization circuit having N+1 serial flip-flops). The N−1 one clock cycle improvement in latency is obtained by operating N parallel flip-flops at a speed of 1/N of the speed of CLOCK.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims.

The description of the invention set forth herein is illustrative, and is not intended to limit the scope of the invention as set forth in the following claims. For example, while the invention has been described in an embodiment in which D flip-flops are used, one of skill in the art will appreciate that the teachings herein can be utilized with other types of sequential devices (e.g., sense-amplifier-based flip-flops or other types of flip-flops). Variations and modifications of the embodiments disclosed herein, may be made based on the description set forth herein, without departing from the scope and spirit of the invention as set forth in the following claims.

What is claimed is:

1. A method comprising:
    sampling a first signal at a first frequency to thereby generate a plurality of sampled versions of the first signal, the first frequency being a frequency of a clock signal divided by N, N being a number greater than one, the sampling the first signal using N versions of the clock signal, the N versions of the clock signal triggering the sampling at different times, each of the N versions of the clock signal having a frequency equal to the first frequency; and
    sampling a second signal at the frequency of the clock signal, the second signal being based on sequentially selected ones of the plurality of sampled versions of the first signal to thereby generate an output version of the first signal.

2. The method, as recited in claim 1, wherein the output version of the first signal is synchronous to a delayed version of the clock signal.

3. The method, as recited in claim 1, further comprising:
    sequentially selecting individual sampled signals of the plurality of sampled versions of the first signal as the second signal according to a select signal, a frequency of the selecting being the same as the frequency of the clock signal.

4. The method, as recited in claim 3, further comprising: generating the select signal based on at least one sampled version of the clock signal.

5. The method, as recited in claim 1, wherein the N versions of the clock signal form a multiple-phase clock signal, each phase of the multiple-phase clock signal having a frequency equal to the first frequency.

6. The method, as recited in claim 1, wherein N equals two and a first version of the clock signal and a second version of the clock signal are approximately 180 degrees out of phase.

7. The method, as recited in claim 1, wherein N equals two and the method further comprises:
    generating a first version of the clock signal and a second version of the clock signal based on even and odd cycles of the clock signal, respectively.

8. The method, as recited in claim, further comprising:
    generating an output clock signal based on the N versions of the clock signal and having a frequency the same as the clock signal, the second signal being sampled using the output clock signal.

9. The method, as recited in claim 1, wherein N is an integer greater than one.

10. An apparatus comprising:
    a first sampling circuit operative to generate a version of a signal based on sequential selection of individual sampled versions of the signal from a plurality of sampled versions of the signal, the plurality of sampled versions of the signal being sampled using N frequency-divided versions of a clock signal, the N versions of the clock signal triggering sampling at different times, each of the N versions of the clock signal having a first frequency, the first frequency being a frequency of the clock signal divided by N, N being a number greater than one; and
    a second sampling circuit operative to sample the version of the signal at the frequency of the clock signal to thereby generate an output signal.

11. The apparatus, as recited in claim 10, wherein the output signal is synchronous to a delayed version of the clock signal.

12. The apparatus, as recited in claim 10, wherein the first sampling circuit comprises a select circuit operative to select individual sampled signals of the plurality of sampled versions of the first signal as the version of the signal according to a select signal, a frequency of the selecting being the same as the frequency of the clock signal.

13. The apparatus, as recited in claim 10, wherein the first sampling circuit comprises:
    N synchronization devices, individual synchronization devices of the N synchronization devices corresponding to respective individual frequency-divided versions of the clock signal of the N frequency-divided versions of the clock signal.

14. The apparatus, as recited in claim 10, wherein the N versions of the clock signal form a multiphase-clock signal, each phase of the multiple-phase clock signal having a frequency equal to the first frequency.

15. The apparatus, as recited in claim 10, wherein the second sampling circuit is operative to generate the output signal using an output clock signal based on the N versions of the clock signal and having a frequency the same as the clock signal.

16. The apparatus, as recited in claim 10, wherein N equals two and a first version of the clock signal and a second version of the clock signal are approximately 180 degrees out of phase.

17. The apparatus, as recited in claim 10, wherein N is an integer greater than one.

18. The apparatus, as recited in claim 10, further comprising:

a clock generator circuit operative to generate the N, frequency-divided versions of the clock signal having the first frequency.

19. The apparatus, as recited in claim 18, wherein the clock generator circuit is further operative to provide a select signal to the sampling circuit.

20. The apparatus, as recited in claim 18, wherein N equals two and the clock generator circuit comprises:
   a synchronization device responsive to a complementary output of the synchronization device and a complement of the clock signal;
   a first logic gate responsive to an output of the synchronization device and the clock signal to thereby generate a first frequency-divided version of the clock signal; and
   a second logic gate responsive to the clock signal and a complementary output of the synchronization device to thereby generate a second frequency-divided version of the clock signal, wherein the second frequency-divided version is complementary to the first frequency-divided version of the clock signal.

21. The apparatus, as recited in claim 20, wherein the clock generator circuit is operative to provide the complementary output of the synchronization device as the select signal to the sampling circuit.

22. A tangible computer-readable medium storing instructions adapted to create a circuit operative to sample a first signal at a first frequency to thereby generate a plurality of sampled versions of the first signal, the first frequency being a frequency of a clock signal divided by N, N being a number greater than one, the first signal being sampled using N versions of the clock signal, the N versions of the clock signal triggering sampling at different times, each of the N versions of the clock signal having a frequency equal to the first frequency wherein the circuit is operative to sample a second signal at the frequency of the clock signal, the second signal being based on sequentially selected ones of the plurality of sampled versions of the first signal to thereby generate an output version of the first signal.

* * * * *

UNITED STATES PATENT AND TRADEMARK OFFICE
CERTIFICATE OF CORRECTION

PATENT NO. : 8,837,639 B2  Page 1 of 1
APPLICATION NO. : 12/818219
DATED : September 16, 2014
INVENTOR(S) : Ioan Cordos It is certified that error appears in the above-identified patent and that said Letters Patent is hereby corrected as shown below:

In the Claims

Column 6, Claim 8, line 1, insert -- 1 -- after "claim".

Signed and Sealed this
Tenth Day of February, 2015

Michelle K. Lee
*Deputy Director of the United States Patent and Trademark Office*